United States Patent
Majumdar et al.

(10) Patent No.: US 9,906,704 B2
(45) Date of Patent: Feb. 27, 2018

(54) MANAGING CROWD SOURCED PHOTOGRAPHY IN A WIRELESS NETWORK

(71) Applicant: QUALCOMM Incorporated, San Diego, CA (US)

(72) Inventors: Somdeb Majumdar, Mission Viejo, CA (US); Regan Blythe Towal, La Jolla, CA (US); M Anthony Lewis, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/857,630

(22) Filed: Sep. 17, 2015

(65) Prior Publication Data

US 2017/0085774 A1    Mar. 23, 2017

(51) Int. Cl.
| | |
|---|---|
| *H04N 5/232* | (2006.01) |
| *H04N 5/247* | (2006.01) |
| *G06K 9/62* | (2006.01) |
| *H04N 1/00* | (2006.01) |
| *H04N 1/32* | (2006.01) |

(52) U.S. Cl.
CPC ....... *H04N 5/23206* (2013.01); *G06K 9/6227* (2013.01); *G06K 9/6284* (2013.01); *H04N 1/00307* (2013.01); *H04N 1/00347* (2013.01); *H04N 1/00973* (2013.01); *H04N 1/32117* (2013.01); *H04N 5/23216* (2013.01); *H04N 5/23222* (2013.01); *H04N 5/247* (2013.01); *H04N 2201/0074* (2013.01)

(58) Field of Classification Search
CPC ........... H04N 1/00251; H04N 1/00381; H04N 5/232; H04N 5/23216; H04N 5/23219; H04N 5/23206; H04N 21/4223; H04N 7/185
USPC ..... 348/159, 169, 211.1–211.4, 211.9, 207.1
See application file for complete search history.

(56) References Cited

U.S. PATENT DOCUMENTS

| | | | |
|---|---|---|---|
| 7,542,588 B2 * | 6/2009 | Ekin | G01S 3/7864 348/143 |
| 8,571,331 B2 | 10/2013 | Cifarelli | |
| 8,738,553 B1 | 5/2014 | Leung et al. | |
| 8,767,081 B2 * | 7/2014 | Kaheel | H04N 5/272 348/207.1 |
| 8,891,883 B2 | 11/2014 | Murphy-Chutorian et al. | |
| 8,934,661 B2 | 1/2015 | Dolson et al. | |
| 9,742,976 B2 * | 8/2017 | Feltham | H04N 5/23206 |
| 2005/0134685 A1 * | 6/2005 | Egnal | H04N 7/181 348/157 |

(Continued)

FOREIGN PATENT DOCUMENTS

JP    2012050011 A    3/2012

OTHER PUBLICATIONS

International Search Report and Written Opinion—PCT/US2016/045201—ISA/EPO—Oct. 27, 2016.

(Continued)

*Primary Examiner* — Kelly L Jerabek

(57) ABSTRACT

An intelligent camera network cooperatively acquires images over a wireless network. The network automatically captures images based on a trigger. The trigger may include messages from other image capturing devices. A first image capture devices is triggered to acquire an image based on a message from at least one other image capture device.

32 Claims, 10 Drawing Sheets

(56) References Cited

U.S. PATENT DOCUMENTS

| | | | |
|---|---|---|---|
| 2008/0216125 A1* | 9/2008 | Li | H04N 13/0239 |
| | | | 725/62 |
| 2010/0009700 A1* | 1/2010 | Camp, Jr. | H04M 1/72572 |
| | | | 455/456.6 |
| 2010/0180297 A1* | 7/2010 | Levine | H04N 5/45 |
| | | | 725/38 |
| 2011/0267499 A1* | 11/2011 | Wan | H04N 5/232 |
| | | | 348/231.99 |
| 2012/0281101 A1 | 11/2012 | Fujinawa et al. | |
| 2014/0285679 A1 | 9/2014 | Saitou | |
| 2014/0286566 A1* | 9/2014 | Rhoads | H04N 13/0275 |
| | | | 382/154 |
| 2014/0333775 A1* | 11/2014 | Naikal | H04N 7/181 |
| | | | 348/159 |
| 2015/0036919 A1 | 2/2015 | Bourdev et al. | |
| 2016/0077422 A1* | 3/2016 | Wang | G03B 37/04 |
| | | | 348/38 |

OTHER PUBLICATIONS

Wen J., et al.,"Fun, Cool . . . and Awkward", Proceedings of the 17th International Conference on Human-Computer Interaction With Mobile Devices and Services Adjunct, MOBILEHCI '15, Aug. 24, 2015 (Aug. 24, 2015),-Aug. 27, 2015 (Aug. 27, 2015), pp. 831-837, XP055312366, New York, USA DOI: 10.1145/2786567.2793708 ISBN: 978-1-4503-3653-6.

* cited by examiner

MANAGING CROWD SOURCED PHOTOGRAPHY IN A WIRELESS NETWORK

BACKGROUND

Field

Certain aspects of the present disclosure generally relate to machine learning and, more particularly, to systems and methods of managing multimedia over a wireless network, including automatically capturing images via a cooperative photography mechanism.

Background

An artificial neural network, which may comprise an interconnected group of artificial neurons (e.g., neuron models), is a computational device or represents a method to be performed by a computational device.

Convolutional neural networks are a type of feed-forward artificial neural network. Convolutional neural networks may include collections of neurons that each have a receptive field and that collectively tile an input space. Convolutional neural networks (CNNs) have numerous applications. In particular, CNNs have broadly been used in the area of pattern recognition and classification.

Deep learning architectures, such as deep belief networks and deep convolutional networks, are layered neural networks architectures in which the output of a first layer of neurons becomes an input to a second layer of neurons, the output of a second layer of neurons becomes and input to a third layer of neurons, and so on. Deep neural networks may be trained to recognize a hierarchy of features and so they have increasingly been used in object recognition applications. Like convolutional neural networks, computation in these deep learning architectures may be distributed over a population of processing nodes, which may be configured in one or more computational chains. These multi-layered architectures may be trained one layer at a time and may be fine-tuned using back propagation.

Other models are also available for object recognition. For example, support vector machines (SVMs) are learning tools that can be applied for classification. Support vector machines include a separating hyperplane (e.g., decision boundary) that categorizes data. The hyperplane is defined by supervised learning. A desired hyperplane increases the margin of the training data. In other words, the hyperplane should have the greatest minimum distance to the training examples.

Although these solutions achieve excellent results on a number of classification benchmarks, their computational complexity can be prohibitively high. Additionally, training of the models may be challenging.

SUMMARY

In one aspect, a method of cooperative photography is disclosed. The method includes triggering a first image capture device to acquire an image based at least in part on a message from at least one other image capture device.

Another aspect discloses an apparatus for cooperative photography including means for triggering a first image capture device to acquire an image based at least in part on a message from at least one other image capture device. The apparatus also includes means for acquiring the image.

Another aspect discloses wireless communication having a memory and at least one processor coupled to the memory. The processor(s) is configured to trigger a first image capture device to acquire an image based at least in part on a message from at least one other image capture device.

Another aspect discloses a non-transitory computer-readable storage medium for cooperative photography. The computer-readable medium has non-transitory program code recorded thereon which, when executed by the processor(s), causes the processor(s) to perform the operation of triggering a first image capture device to acquire an image based at least in part on a message from at least one other image capture device.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
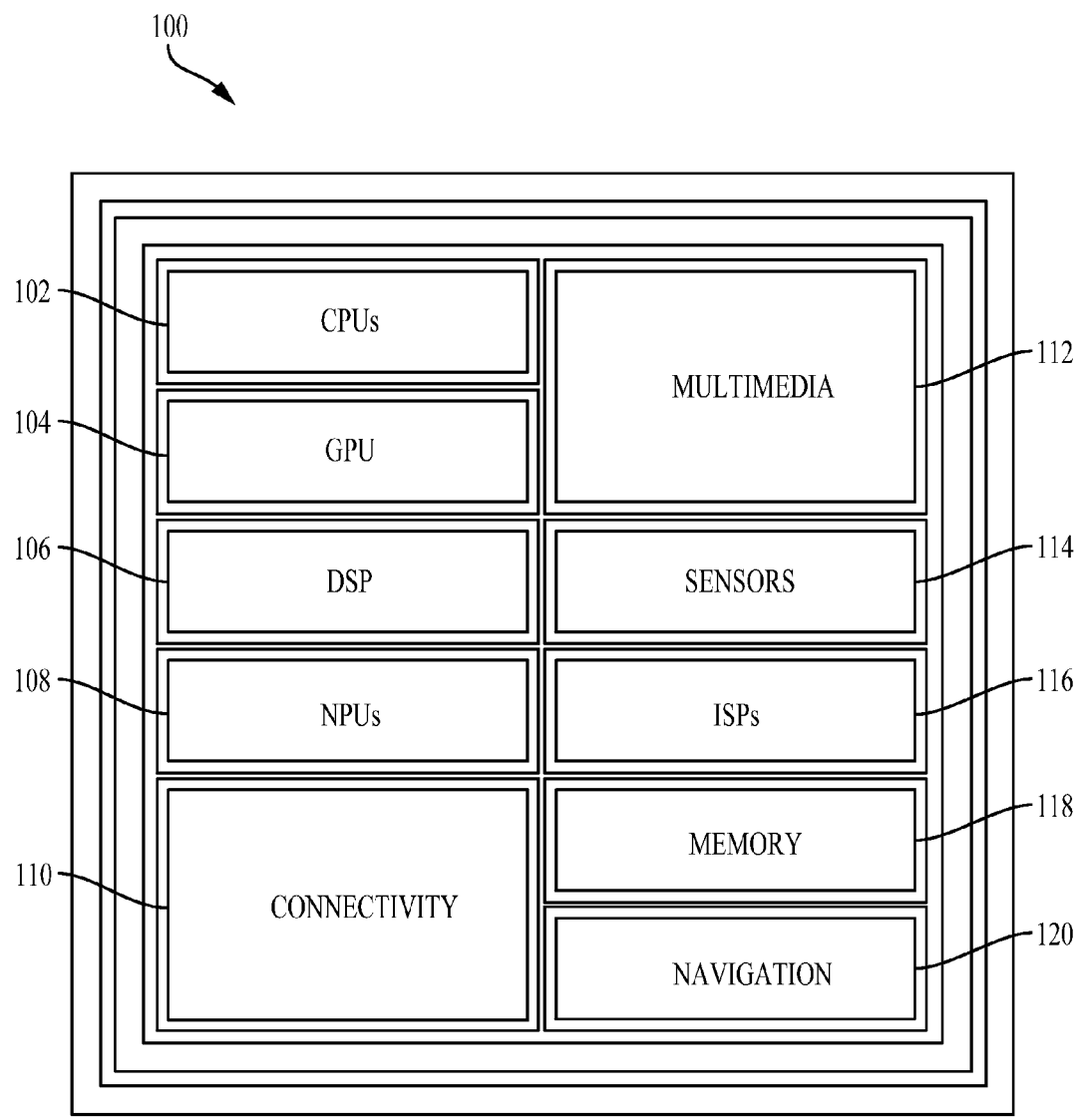
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Aspects of the present disclosure are directed to systems and methods for cooperative photography, and in particular to triggers for automatically capturing photographs. Additionally, optional aspects are directed to managing the captured picture and image files over a wireless network (including, a subscription based network). The acquired images/photos are ranked on the network based on general rankings, user defined ranking criteria and other criteria. The high ranking photos are distributed to user devices (e.g., mobile devices) and a secondary ranking occurs at each user's device. The secondary ranking is determined by user criteria.

FIG. 1 illustrates an example implementation 100 of the aforementioned cooperative photography system and/or multi-media management system using a system-on-a-chip (SOC) 100, which may include a general-purpose processor (CPU) or multi-core general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks tailored to specific functions, such as a GPU 104, a DSP 106, a connectivity block 110, which may include fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs), and/or navigation 120, which may include a global positioning system.

The SOC may be based on an ARM instruction set. In an aspect of the present disclosure, the instructions loaded into the general-purpose processor 102 may comprise code for ranking photos collected from multiple users in the wireless network. The instructions may also include code for distributing the photos to users based on a second set of user preferences and the ranking. Additionally, the general-purpose processor 102 may comprise code for triggering an image capture device to acquire an image based on a message from at least one other image capture device (e.g., another camera).

Figure 2:
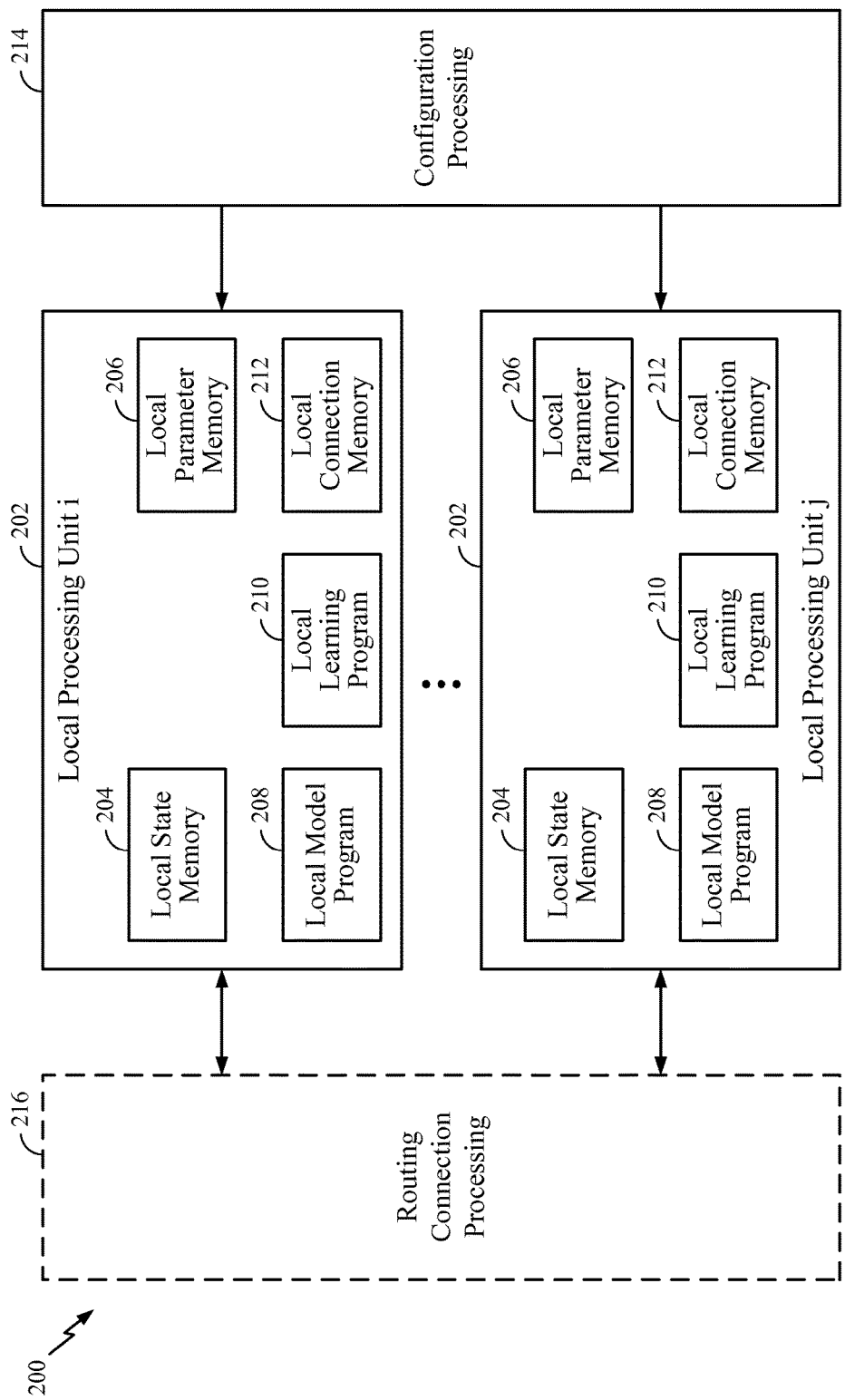
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may comprise a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize simple features, such as edges, in the input stream. If presented with auditory data, the first layer may learn to recognize spectral power in specific frequencies. The second layer, taking the output of the first layer as input, may learn to recognize combinations of features, such as simple shapes for visual data or combinations of sounds for auditory data. Higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer is communicated to another neuron in the same layer. A recurrent architecture may be helpful in recognizing patterns that unfold in time. A connection from a neuron in a given layer to a neuron in a lower layer is called a feedback (or top-down) connection. A network with many feedback connections may be helpful when the recognition of a high level concept may aid in discriminating the particular low-level features of an input.

Figure 3A:
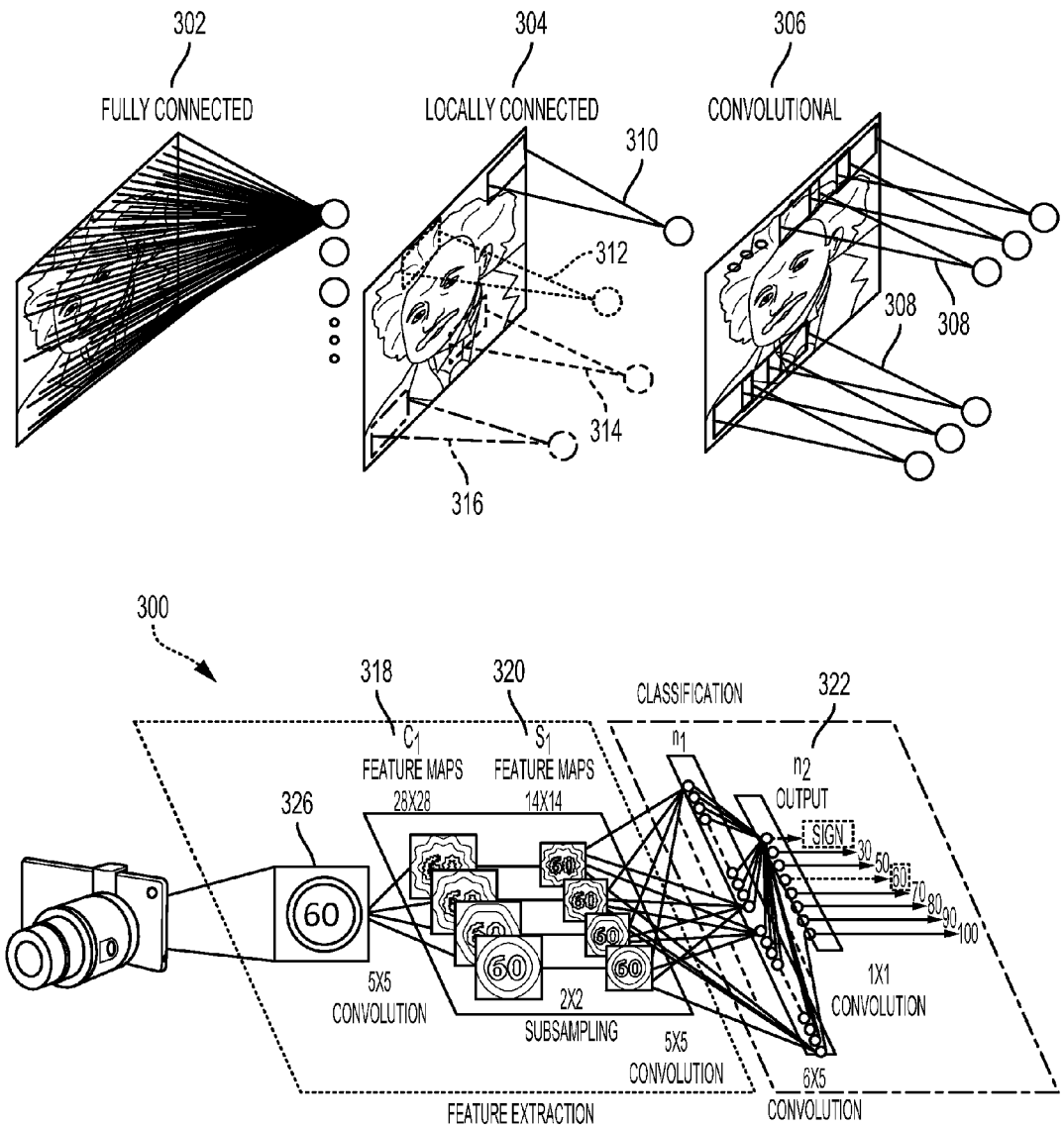
FIG. 3A is a diagram illustrating a neural network in accordance with aspects of the present disclosure.

Referring to FIG. 3A, the connections between layers of a neural network may be fully connected 302 or locally connected 304. In a fully connected network 302, a neuron in a given layer may communicate its output to every neuron in the next layer. Alternatively, in a locally connected network 304, a neuron in a given layer may be connected to a limited number of neurons in the next layer. A convolutional network 306 may be locally connected, and is furthermore a special case in which the connection strengths associated with each neuron in a given layer are shared (e.g., 308). More generally, a locally connected layer of a network may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

Locally connected neural networks may be well suited to problems in which the spatial location of inputs is meaningful. For instance, a network 300 designed to recognize visual features from a car-mounted camera may develop high layer neurons with different properties depending on their association with the lower versus the upper portion of the image. Neurons associated with the lower portion of the image may learn to recognize lane markings, for example, while neurons associated with the upper portion of the image may learn to recognize traffic lights, traffic signs, and the like.

A deep convolutional network (DCN) may be trained with supervised learning. During training, a DCN may be presented with an image 326, such as a cropped image of a speed limit sign, and a "forward pass" may then be computed to produce an output 328. The output 328 may be a vector of values corresponding to features such as "sign," "60," and "100." The network designer may want the DCN to output a high score for some of the neurons in the output feature vector, for example the ones corresponding to "sign" and "60" as shown in the output 328 for a network 300 that has been trained. Before training, the output produced by the DCN is likely to be incorrect, and so an error may be calculated between the actual output and the target output. The weights of the DCN may then be adjusted so that the output scores of the DCN are more closely aligned with the target.

To properly adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images 326 and a forward pass through the network may yield an output 328 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer 318, 320, and 322, with each element of the feature map (e.g., 320) receiving input from a range of neurons in the previous layer (e.g., 318) and from each of the multiple channels. The values in the feature map may be further processed with a non-linearity, such as a rectification, max(0,x). Values from adjacent neurons may be further pooled 324, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3B:
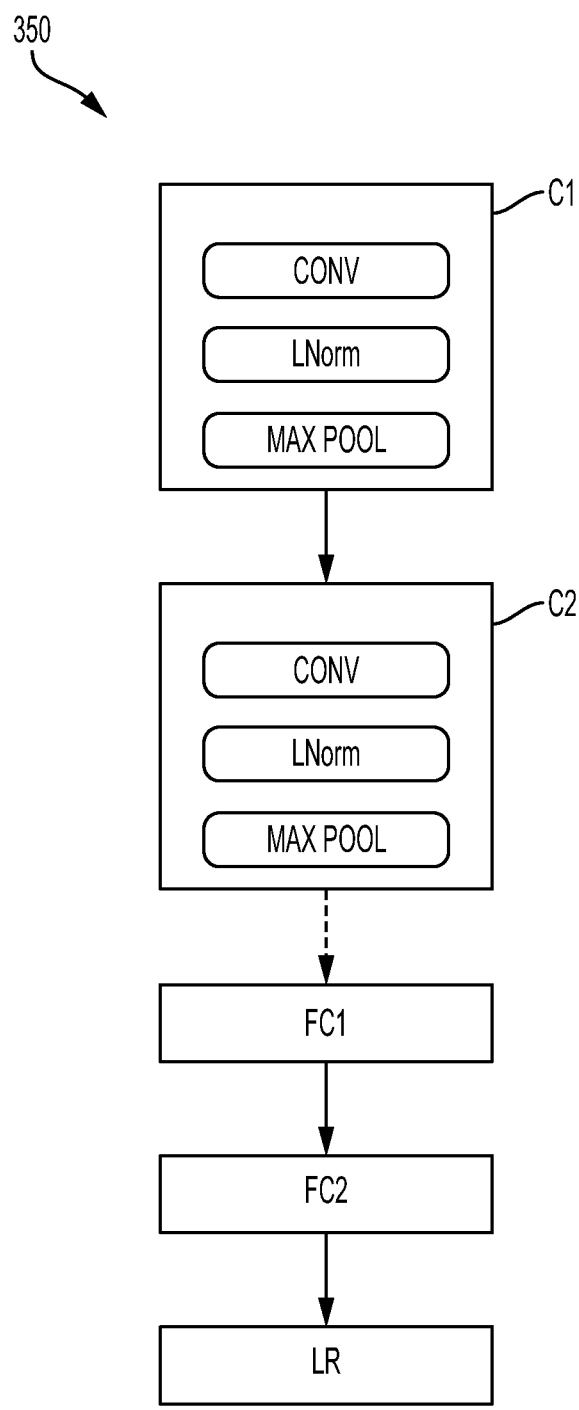
FIG. 3B is a block diagram illustrating an exemplary deep convolutional network (DCN) in accordance with aspects of the present disclosure.

FIG. 3B is a block diagram illustrating an exemplary deep convolutional network 350. The deep convolutional network 350 may include multiple different types of layers based on connectivity and weight sharing. As shown in FIG. 3B, the exemplary deep convolutional network 350 includes multiple convolution blocks (e.g., C1 and C2). Each of the convolution blocks may be configured with a convolution layer, a normalization layer (LNorm), and a pooling layer. The convolution layers may include one or more convolutional filters, which may be applied to the input data to generate a feature map. Although only two convolution blocks are shown, the present disclosure is not so limiting, and instead, any number of convolutional blocks may be included in the deep convolutional network 350 according to design preference. The normalization layer may be used to normalize the output of the convolution filters. For example, the normalization layer may provide whitening or lateral inhibition. The pooling layer may provide down sampling aggregation over space for local invariance and dimensionality reduction.

The parallel filter banks, for example, of a deep convolutional network may be loaded on a CPU 102 or GPU 104 of an SOC 100, optionally based on an ARM instruction set, to achieve high performance and low power consumption. In alternative embodiments, the parallel filter banks may be loaded on the DSP 106 or an ISP 116 of an SOC 100. In addition, the DCN may access other processing blocks that may be present on the SOC, such as processing blocks dedicated to sensors 114 and navigation 120.

The deep convolutional network 350 may also include one or more fully connected layers (e.g., FC1 and FC2). The deep convolutional network 350 may further include a logistic regression (LR) layer. Between each layer of the deep convolutional network 350 are weights (not shown) that are to be updated. The output of each layer may serve as an input of a succeeding layer in the deep convolutional network 350 to learn hierarchical feature representations from input data (e.g., images, audio, video, sensor data and/or other input data) supplied at the first convolution block C1.

Figure 4:
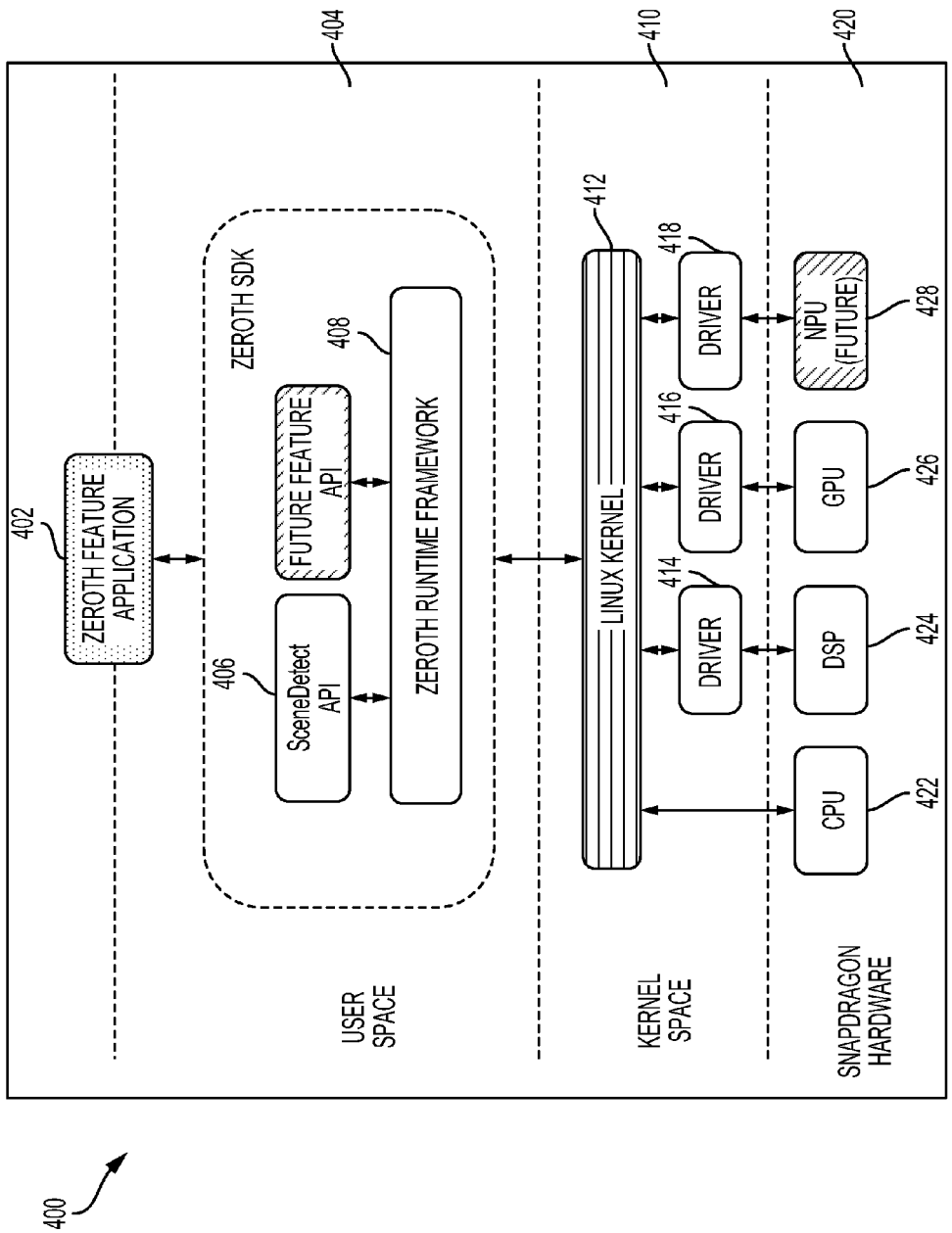
FIG. 4 is a block diagram illustrating an exemplary software architecture that may modularize artificial intelligence (AI) functions in accordance with aspects of the present disclosure.

FIG. 4 is a block diagram illustrating an exemplary software architecture 400 that may modularize artificial intelligence (AI) functions. Using the architecture, applications 402 may be designed that may cause various processing blocks of an SOC 420 (for example a CPU 422, a DSP 424, a GPU 426 and/or an NPU 428) to perform supporting computations during run-time operation of the application 402.

The AI application 402 may be configured to call functions defined in a user space 404 that may, for example, provide for the detection and recognition of a scene indicative of the location in which the device currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in a SceneDetect application programming interface (API) 406 to provide an estimate of the current scene. This request may ultimately rely on the output of a deep neural network configured to provide scene estimates based on video and positioning data, for example.

A run-time engine 408, which may be compiled code of a Runtime Framework, may be further accessible to the AI application 402. The AI application 402 may cause the run-time engine, for example, to request a scene estimate at a particular time interval or triggered by an event detected by the user interface of the application. When caused to estimate the scene, the run-time engine may in turn send a signal to an operating system 410, such as a Linux Kernel 412, running on the SOC 420. The operating system 410, in turn, may cause a computation to be performed on the CPU 422, the DSP 424, the GPU 426, the NPU 428, or some combination thereof. The CPU 422 may be accessed directly by the operating system, and other processing blocks may be accessed through a driver, such as a driver 414-418 for a DSP 424, for a GPU 426, or for an NPU 428. In the exemplary example, the deep neural network may be configured to run on a combination of processing blocks, such as a CPU 422 and a GPU 426, or may be run on an NPU 428, if present.

Figure 5:
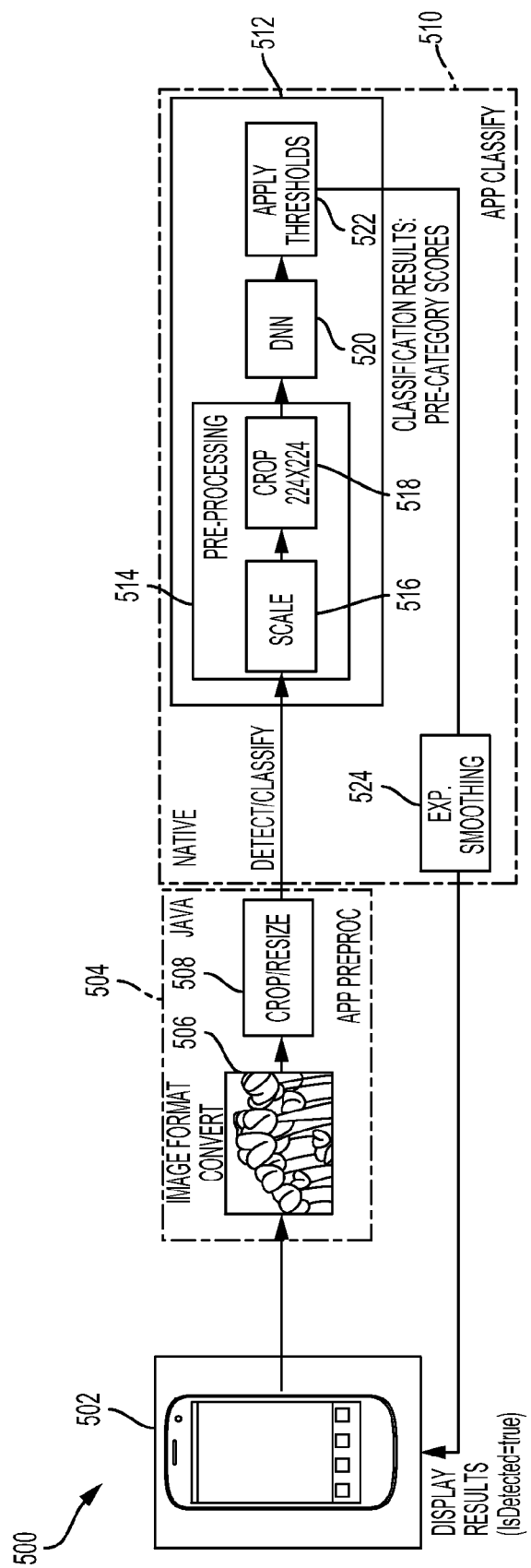
FIG. 5 is a block diagram illustrating the run-time operation of an AI application on a smartphone in accordance with aspects of the present disclosure.

FIG. 5 is a block diagram illustrating the run-time operation 500 of an AI application on a smartphone 502. The AI application may include a pre-process module 504 that may be configured (using for example, the JAVA programming language) to convert the format of an image 506 and then crop and/or resize the image 508. The pre-processed image may then be communicated to a classify application 510 that contains a SceneDetect Backend Engine 512 that may be configured (using for example, the C programming language) to detect and classify scenes based on visual input. The SceneDetect Backend Engine 512 may be configured to further pre-process 514 the image by scaling 516 and cropping 518. For example, the image may be scaled and cropped so that the resulting image is 224 pixels by 224 pixels. These dimensions may map to the input dimensions of a neural network. The neural network may be configured by a deep neural network block 520 to cause various processing blocks of the SOC 100 to further process the image pixels with a deep neural network. The results of the deep neural network may then be thresholded 522 and passed through an exponential smoothing block 524 in the classify application 510. The smoothed results may then cause a change of the settings and/or the display of the smartphone 502.

Managing Crowd Sourced Photography

Aspects of the present disclosure are directed to an intelligent camera network that cooperatively acquires images. In particularly, the network is configured to automatically capture images based on a trigger, which may include messages from other image capturing devices. Additionally, the network is configured to take the "best" images. The network may optionally distribute crowd-sourced pictures taken from the same event. One aspect includes crowd sourcing the "best" images of an event where multiple people/devices are taking pictures. For example, at an event with many different people, such as a soccer event, aspects of the present disclosure provide users with the best photos for a particular user. For example, if a soccer player is scoring a goal, a fan on one side of the soccer stadium may have a better view point and may capture a better photo than a fan on the opposite side of the stadium. Aspects of the present disclosure enable fans to obtain a copy of the better photo of the player scoring the goal.

Figure 6A:
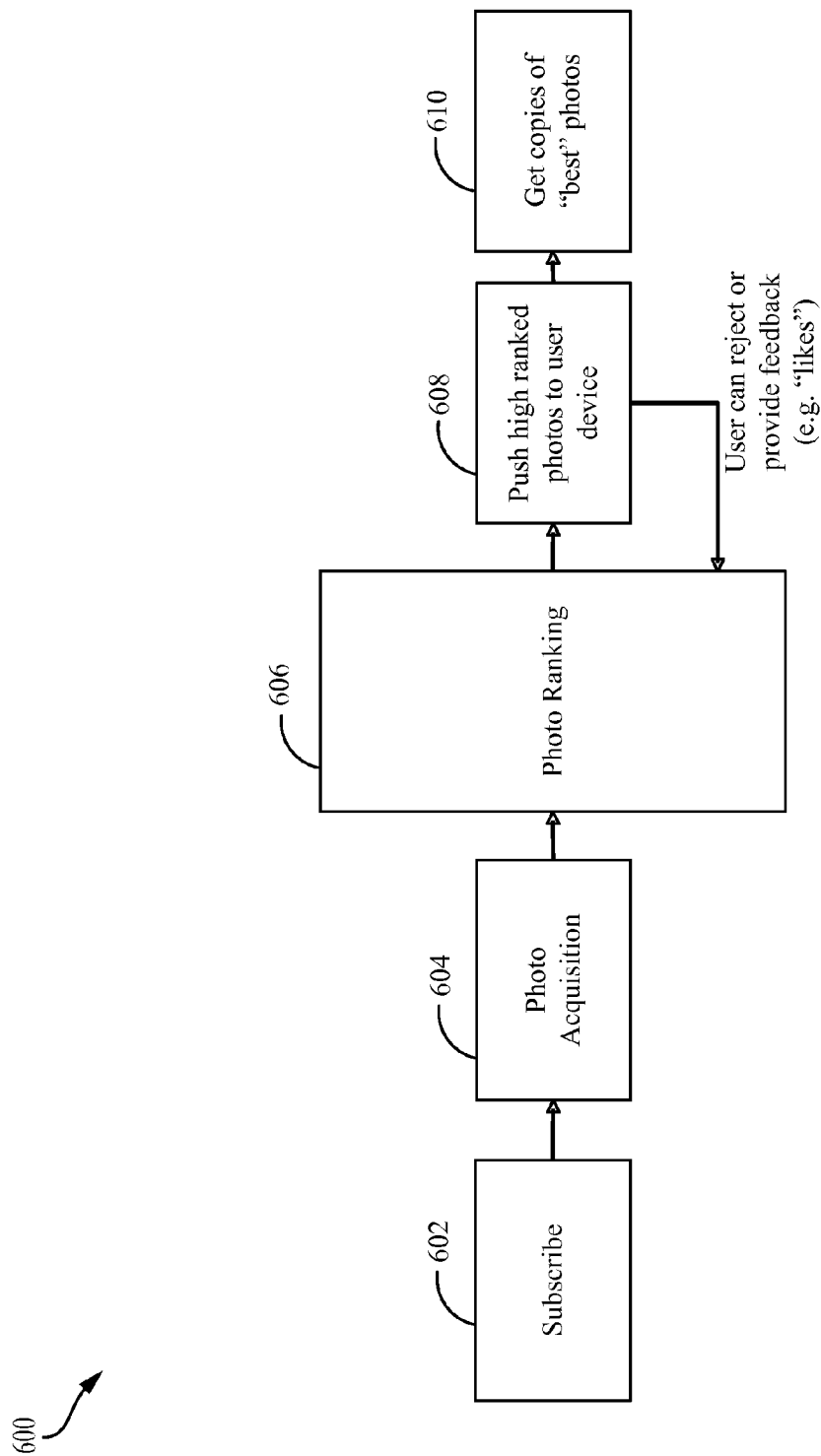
FIG. 6A is a block diagram illustrating the run-time operation of an AI application for managing multimedia on a smartphone in accordance with aspects of the present disclosure.

FIG. 6A is a block diagram illustrating an example operation of the multimedia management system 600. At block 602, a user subscribes or joins a photo sharing stream or service. The stream or service may be free or may be fee based. For example, there may be a fee for each photo downloaded. In some cases, a premium can be charged for photos taken by certain people, e.g., professionals. In one aspect, a subscription sharing service is utilized. The service may be associated with a software application on a user device (e.g., smartphone). In block 604, the photos are acquired. In one aspect, the photos are acquired automatically. The system 600 may include an auto capture capability where a user device can initiate the automatic capture of photos when an image is "interesting." Interesting may refer to lots of activity, peak activity, motion near important objects (like goals), etc. The measure of interestingness may be based on computations on the device itself Alternately, the measure of interestingness may be based on off device calculations.

In another aspect, a device may be configured to initiate photo capture automatically. Many different factors may trigger the automatic acquisition of images. In one example, metadata may trigger the acquisition. For example, the metadata may indicate whether a score at an event just changed. Additionally, the metadata may be associated with tweets linked to an event which may then trigger the device to automatically take pictures. The device may include, but is not limited to, a smart phone and a camera. In one example, the camera has access to metadata streams and is configured to automatically take pictures when something of interest is indicated in the metadata.

Figure 6B:
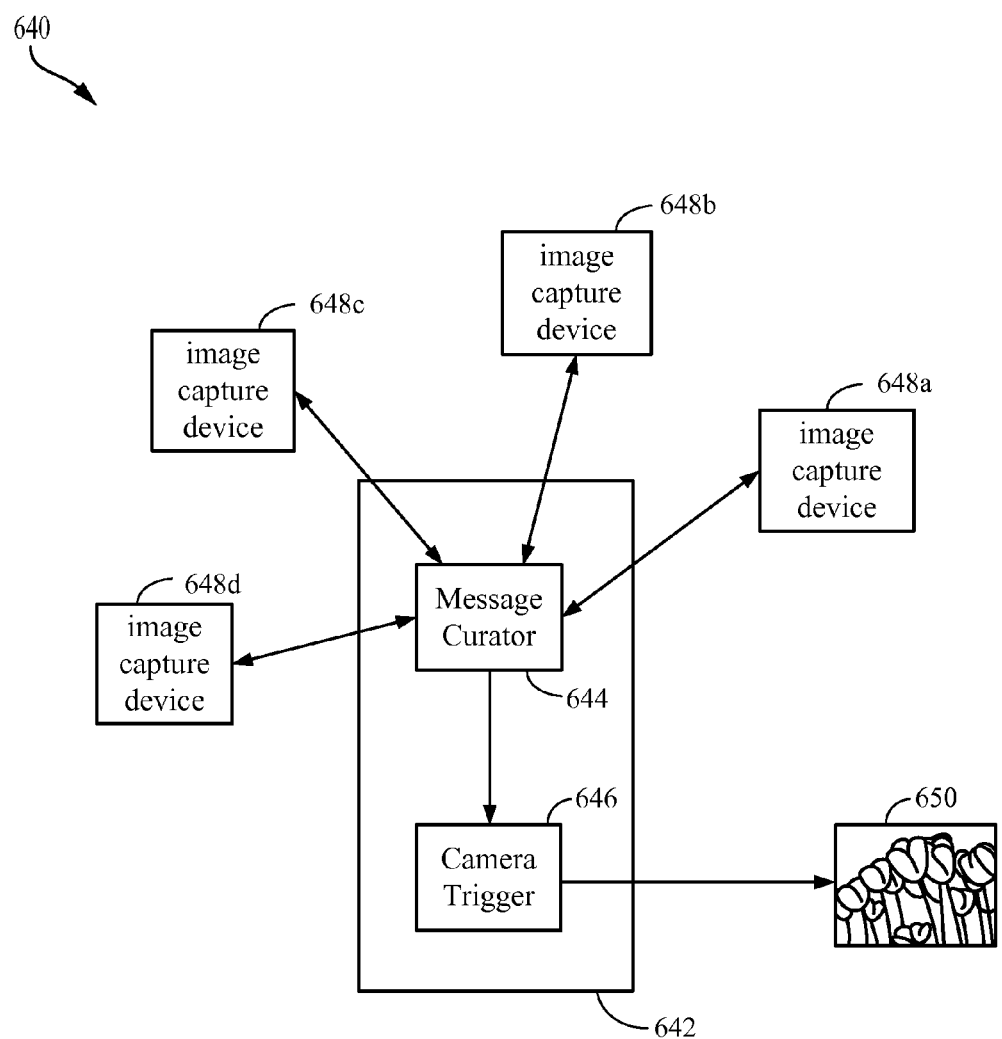
FIG. 6B is a block diagram illustrating an operation for cooperative photography in accordance with aspects of the present disclosure.

In one aspect, a cooperative photography system is utilized for the automatic capture of images. FIG. 6B illustrates an example of a cooperative photography system 640 for use in the acquisition of images and photos. An image capture device 642 includes a message curator 644 and a camera trigger 646. Examples of image capture devices may include, but are not limited to, cameras, internet protocol (IP) cameras, video cameras, smart phones, etc. The image capture device 642 is in communication with other image capture devices 648*a-d*. For example, the image capture device 642 may send and receive communications to the other image capture devices 648*a-d* via the message curator 644. The image capture devices 648*a-d* may be the same type of image capture device or may be different types of image capture devices. Additionally, the image capture devices 642 may be the same as or different from any of the image capture devices 648*a-d*.

In one aspect, the message curator 644 receives a message from one of the image capture devices 648*a-d* that prompts the camera trigger 646 to acquire an image 650. The message may be derived based on the detection or prediction of a predefined triggering factor. The triggering factors may include a specified motion sequence, identity of an entity/object within a scene, location data, behavioral patterns, composition and temporal data. A deep neural network may be utilized to predict the occurrence of a predefined triggering factor.

In one aspect, the received message is based on detecting a relevant or specified motion sequence. For example, during sporting events it is desirable to capture intense moments in a game, such as when a goalkeeper makes a great save. Upon detecting the goalkeeper making a save, the image capture device 642 is triggered to automatically capture an image of the goalkeeper's save.

In another example, the message is based on predicting a relevant specified motion sequence. For example, during a sporting event, the image capture device 642 receives input from other image capture devices 648*a-d* that may include specified motion sequence information detailing the movement of players. Based on the received input and analysis of the motion sequence information, it may be predicted when a player may shoot at the goal. Upon predicting the shot on goal, the image capture device 642 is triggered to prepare itself for capturing a photo of the player making a shot.

The message configured to trigger the acquisition of an image may also be based on the detection or prediction of the identity of an entity and/or object within a scene. In particular, the message may be based on specific objects, human beings, animals or pets in a scene. For example, the cooperative photography system 640 may be utilized in a wild outdoor habitat to capture animal behavior. According to aspects of the present disclosure, images may be captured of specific animals. In particular, a picture may be taken of a white leopard where the cooperative photography system 640 can distinguish a white leopard from other animals such that the system 640 only captures images of the white leopard and not images of other animals. Upon detection of the specific animal (e.g., the white leopard) the image capture device 642 is triggered to acquire an image 650. Additionally, in another aspect, other image capture devices may be alerted when to prepare for taking a photo. For example, when the device 648*a* detects the animal of interest, (e.g., the white leopard), it alerts (e.g., sends a message to) the message curator 644, which alerts the other devices 642 and 648*b-d* of the approaching animal of interest. The devices 642 and 648*b-d* prepare for capturing the image of the white leopard. In another aspect, the device 642 or 648*b-d* having the best angle is triggered to capture the image of the white leopard.

The message configured to trigger the image acquisition may be based on behavioral and/or emotional patterns. For example, during sporting events, it is desirable to take photographs of emotionally charged moments, such as when a team wins a championship game. The emotionally charged moment may be predicted based on a combination of metadata, such as the game score, and also the length of time that has passed since the start of the game. In the example of soccer, once the 90 minutes is up and the winning team is about to go into celebration mode, the image capture device 642 can begin preparing to capture images.

In another example, the image capture devices 648*a-d* may be part of a social network. When many devices are taking pictures it may be an indication something interesting is occurring. The behavioral pattern related to many devices taking pictures may then prompt the sending of a message to trigger image capture.

The message configured to trigger image acquisition may be based on composition. For example, for a picture of a family in front of the sunset, the scene may change quickly as the sun begins to set. The best moment for taking the photograph may consider the perfect silhouette with the sun along with lighting conditions. Once the best composition is available, the image capture device 642 may be triggered to automatically capture the scene. Further, metadata information such as time of day, geographic locations, etc., may be utilized to predict the best time for taking the sunset picture. The message curator 644 may receive a message of the predicted best time and trigger the image capture device 642 to prepare for capturing the sunset image at the best time.

In another aspect, the message may include at least one of camera settings, directional instructions, and a description of a scene to be captured. In particular, the message for triggering image acquisition may include camera settings or control commands for camera elements, such as, but not limited to flash, exposure, aperture, etc. For example, a first camera could request another camera to trigger a flash for a photo the first camera is taking. A group of cameras could collaboratively determine lighting conditions.

Additionally, the message may include timing and location information. For example, the message may include commands to take a picture at the current location and/or time. Optionally, the message may include commands to take a picture at a future place and/or time. In another aspect, the message includes a description of the scene to be captured (e.g., video or photo). In one aspect, based on the included description, the image capture device 642 may determine not to acquire a photo. For example, if location information makes it impractical to acquire the image, the device 642 may determine not to take the photo.

The message may include directional instructions and/or directional information. For example, some of the cameras in the network 640 may include pole-mounted cameras. During a sporting event, the pole mounted cameras are configured to capture the best moment. The cameras may be notified by another camera in the network that a goal moment is coming and the camera should prepare by setting itself in the best angle to capture a photo. The message curator 644 sends a message with commands regarding angle and location to prepare the device for capturing images of the upcoming goal. Moreover, multiple images from different cameras could be combined to create a 3D image.

In another aspect, the cooperative photography system 640 is configured to detect the object of interest and the exact location for capturing images. The system 640 is also configured to utilize the best camera and the best location for capturing an image. After the images are automatically captured, a deep neural network may be utilized to determine which images are best. The deep neural network may sort the images into a subset of desired (e.g., useable/best) images.

Referring back to FIG. 6A, after the photos are acquired from users (e.g., multiple users in a wireless network), the photos can be ranked at block 606. The ranking may be based on feature vectors and classified labels. The feature vectors and classified labels may be derived from pixels of the photos, metadata and/or user preferences. The metadata may include, but is not limited to, external data about an event, an image tag, an image label and/or internet traffic about an event (e.g., the number of tweets with a particular hashtag).

Further, the rankings may be based on general rankings and user defined ranking criteria. For example, the photos may be ranked based on the image themselves, such as the quality of the image as well as the content of the image. The ranking process may also be based on the number of pictures taken within a time period. For example, photos that were taken the same time as when many other photos were taken may indicate an interesting event and these photos may be ranked with increased importance. The photo ranking may also be influenced by outside factors. For example, all photos taken just before the score changed at a sporting event may be interesting and ranked higher. Online streaming of game information (or even radio broadcasts) may be utilized to determine the time when a scored changed. Additionally, the ranking may be based on a decibel level in a surrounding area such as cheering at a sporting event (defined by a feature vector).

After the photos are ranked, the high ranked photos are distributed to a user device at block 608 based on the rankings and user preferences. A second ranking may occur at the user's device based on the user's preferences. For example, if 100 photos are pushed to the user's device, the user can reject or like these photos. This information is fed back into the photo ranking algorithm to better personalize the photos received on the user's device to the user's personal preference. After a period of time, the management system 600 learns the user's personal preferences. The user then receives the best photos of an event, in terms of overall quality and also in terms of the user's own personal preferences, at block 610.

Figure 7A:
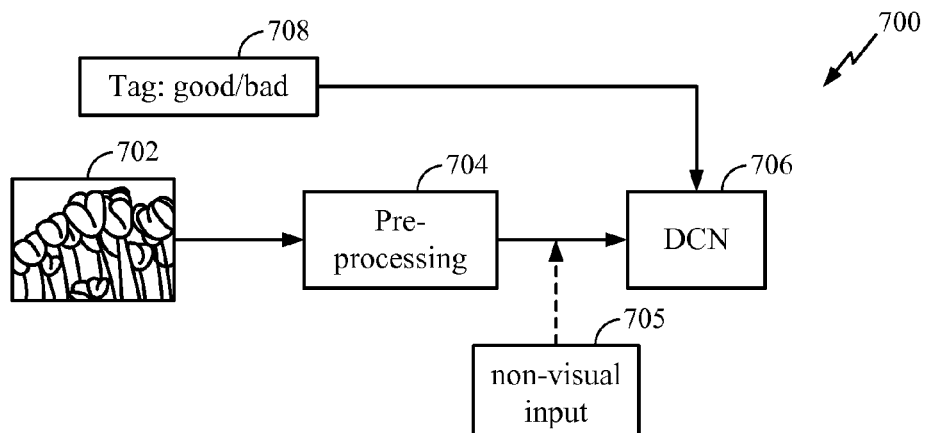
FIGS. 7A-7B are block diagrams illustrating the training of a DCN to rank images in accordance with aspects of the present disclosure.
Figure 7B:
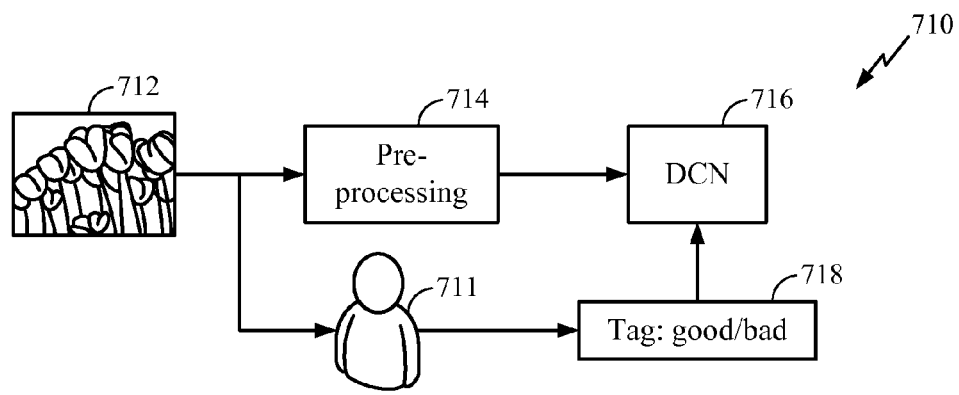

Another aspect is directed to training a neural network, such as a deep convolutional network (DCN), to rank the desirability of images. Labeled images and metadata may be utilized to train the DCN. The training labels may include a normalized desirability score. Additionally, a primary classifier may receive input directly from the DCN to learn a normalized ranking of the desirability of each image. FIGS. 7A-7B illustrate example processes for training a DCN to rank images.

FIG. 7A illustrates a process 700 for training a DCN to learn normalized ranking of the desirability of images. This ranking is a general guideline, as opposed to user specific ranking. In particular, the DCN may be trained, for example, to understand "good" and "bad" photos. A photo 702 is acquired and fed to a pre-processing unit 704. The processed image is then fed to the DCN 706. Additionally, a tag 708 is sent to the DCN 706. The tag 708 is a general tag regarding whether the image is "good" or "bad." In one aspect, the general tag 708 originates from a general population of people. Optionally, non-visual input 705 may also be fed into the DCN 706. Examples of the non-visual input 705 may include, but are not limited to, the number of tweets with a specific hashtag at the time the photo was taken, a game score, a decibel level measured by the device at the time it took the photo, etc.

FIG. 7B illustrates an example process 710 for training a DCN to understand user specific "good" and "bad" photos. In this case, a secondary classifier is user specific and trained based on user feedback. A photo 712 is taken and undergoes pre-processing at the pre-processing unit 714. The image is then sent to the DCN 716. A user 711 can tag the image as good or bad and feed the tag 718 to the DCN 716. A secondary classifier may exist for each user and is trained based on user feedback. The rankings may then be adjusted based on the user feedback. In particular, the tag 718 is user specific. For example, everybody may think a photo is good, but if the user 711 believes the photo is bad, the user 711 will input a user specific tag (e.g., "bad") for the photo 712. For example, in a collection of many pictures (e.g., 100 s), the user identifies the "bad" pictures. The DCN learns the "bad" features and the user tags reinforce performance. Bad features may include, but are not limited to, bad lighting, histogram, skewed lines, partial faces/bodies in frame, motion blur, too many of the same images, etc. Additionally, in some aspects, a binary reward/punishment model may be utilized with DCN features.

In another aspect, normalization is based on the total number of likes, views, shares, hits, or other user feedback measure. Further, users with a special status (e.g., team coach) can provide feedback weighted at the high end of a normalized desirability score spectrum. Additionally, the user feedback may be in the form of good/bad (e.g., likes or not liked) provided through a touch-based input and/or in the form of a gesture made with the device.

Figure 7C:
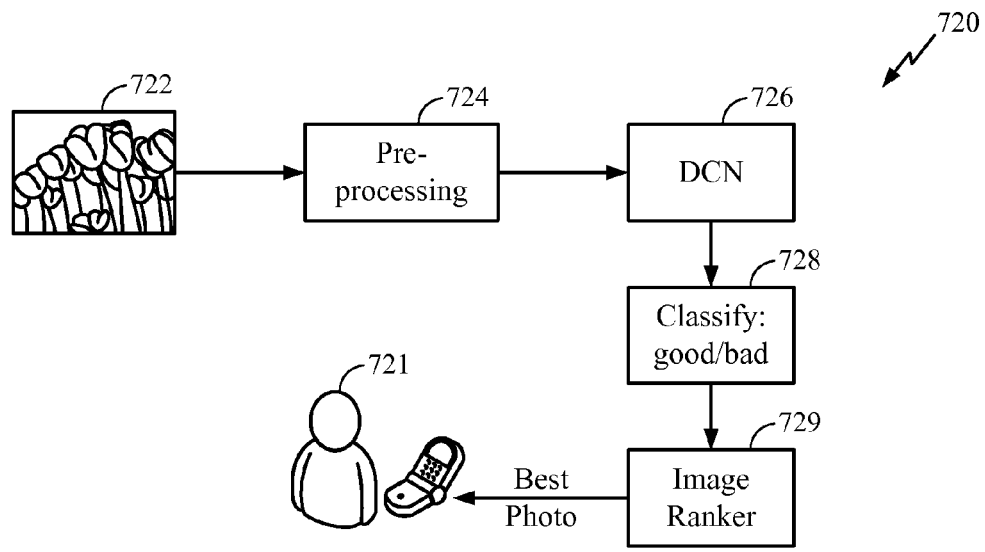
FIG. 7C is a block diagram illustrating a trained DCN ranking images in accordance with aspects of the present disclosure.

FIG. 7C illustrates an example process 720 of utilizing a trained DCN to deliver the best photo to an end user. In particular, after a DCN 726 is trained, a photo 722 is sent to a pre-processing unit 724. The image is then sent to the DCN 726 for classification and ranking. In particular, the trained DCN 726 outputs a classification 728 (e.g., good/bad) and image ranking 729. The best photos (e.g., the highest ranking good photos) are sent to the user 721.

A variety of methods may be implemented to limit the photos received at a user device. Rather than accepting all the best photos, a user may initiate various settings and filters to limit the number of photos pushed to the user device. These filters/settings may be based on certain criteria and/or user settings. For example, a user may only want to accept 10 photos. The user may configure a setting to limit the number of photos pushed to the user device. Additionally, the user may only want to accept pictures of certain people. For example, the user may only want to receive images of his child. This type of setting may be implemented and performed with facial recognition on proposed photos for download. Additionally, a user may limit the received photos to only a group of people. Further, in another aspect, the received photos may be limited by context. For example, the user may decide to only receive photos with a ball in the air. A classifier may be trained by feeding a DCN photos of the particular context (e.g., a basketball player throwing a ball in the air).

In another aspect, a user can reject photos unless they have a higher score than those already downloaded. This allows for memory management at the user device. Additionally, the user can provide feedback to the ranking mechanism. For example, photos with more overall likes are more likely to be ranked highly.

In one configuration, a machine learning model is configured for cooperative photography within a wireless network. The machine learning model includes a means for triggering. In one aspect, the triggering means may be the general-purpose processor 102, program memory associated with the general-purpose processor 102, memory block 118, local processing units 202, and/or the routing connection processing units 216 configured to perform the functions recited. In another configuration, a machine learning model includes a means for acquiring the image. In another configuration, the aforementioned means may be any module or any apparatus configured to perform the functions recited by the aforementioned means.

According to certain aspects of the present disclosure, each local processing unit 202 may be configured to determine parameters of the machine learning network based upon desired one or more functional features of the network, and develop the one or more functional features towards the desired functional features as the determined parameters are further adapted, tuned and updated.

Figure 8:
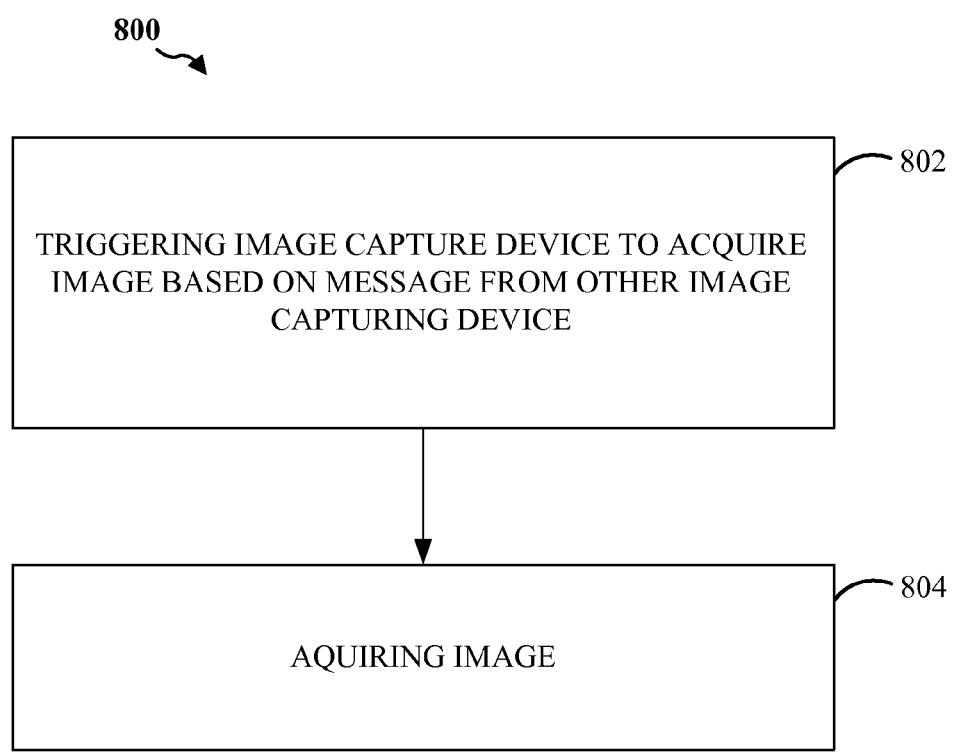
FIG. 8 illustrates a method for managing multimedia according to aspects of the present disclosure.

FIG. 8 illustrates a method 800 for cooperative photography. In block 802, a first image capture device is triggered to acquire an image based on a message from a second image capture device. In block 804, the first image capture device acquires an image.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of cooperative photography, comprising:
receiving, at a first image capture device operated by a first user, a message from a second image capture device operated by a second user, the message based at least in part on a prediction of a specified motion sequence computed by the second image capture device, the message including one or more image capture settings to be applied by the first image capture device, the one or more image capture settings being based on a lighting condition of a scene as determined by the second image capture device; and
acquiring, by the first image capture device, an image of an object of interest based at least in part on the message.

2. The method of claim 1, in which the message is derived based at least in part on an identity of an entity within a scene, location data, behavioral patterns, a composition, temporal data, or any combination thereof.

3. The method of claim 1, in which the message is derived based at least in part on a prediction of one or more of an identity of an entity within a scene, location data, behavioral patterns, a composition, or temporal data.

4. The method of claim 1, in which the message comprises at least one of camera settings, directional instructions, and a description of a scene to be captured.

5. The method of claim 1, in which the first image capture device includes a module that parses the message.

6. The method of claim 1, in which the acquiring is further based at least in part on an output of a deep neural network.

7. The method of claim 1, in which the specified motion sequence is received from the second image capture device.

8. The method of claim 1, in which the prediction of the specified motion sequence by the second image capture device is based at least in part on metadata.

9. The method of claim 8, in which the metadata comprises external data related to an event, an image tag, an image label, a social media post related to the event or a combination thereof.

10. The method of claim 1, in which the message is received based at least in part on a location of the first image capture device relative to the object of interest.

11. An apparatus for cooperative photography, comprising:
means for receiving, at a first image capture device operated by a first user, a message from a second image capture device operated by a second user, the message triggered based at least in part on a prediction of a specified motion sequence computed by the second image capture device, the message including one or more image capture settings to be applied by the first image capture device, the one or more image capture settings being based on a lighting condition of a scene as determined by the second image capture device; and
means for acquiring, by the first image capture device, an image of an object of interest based at least in part on the message.

12. The apparatus of claim 11, in which the message is derived based at least in part on an identity of an entity within a scene, location data, behavioral patterns, a composition, temporal data, or any combination thereof.

13. The apparatus of claim 11, in which the message is derived based at least in part on a prediction of one or more of an identity of an entity within a scene, location data, behavioral patterns, a composition, or temporal data.

14. The apparatus of claim 11, in which the message comprises at least one of camera settings, directional instructions, and a description of a scene to be captured.

15. The apparatus of claim 11, in which the first image capture device includes a module that parses the message.

16. The apparatus of claim 11, in which the means for acquiring is further based at least in part on an output of a deep neural network.

17. The apparatus of claim 11, in which the specified motion sequence is received from the second image capture device.

18. The apparatus of claim 11, in which the prediction of the specified motion sequence by the second image capture device is based at least in part on metadata.

19. The apparatus of claim 18, in which the metadata comprises external data related to an event, an image tag, an image label, a social media post related to the event or a combination thereof.

20. The apparatus of claim 11, in which the message is received based at least in part on a location of the first image capture device relative to the object of interest.

21. An apparatus for cooperative photography, comprising:
- a memory; and
- at least one processor coupled to the memory, the at least one processor being configured:
  - to receive, at a first image capture device operated by a first user, a message from a second image capture device operated by a second user, the message based at least in part on a prediction of a specified motion sequence computed by the second image capture device, the message including one or more image capture settings to be applied by the first image capture device, the one or more image capture settings being based on a lighting condition of a scene as determined by the second image capture device; and
  - to acquire, by the first image capture device, an image of an object of interest based at least in part on the message.

22. The apparatus of claim 21, in which the message is derived based at least in part on an identity of an entity within a scene, location data, behavioral patterns, a composition, temporal data, or any combination thereof.

23. The apparatus of claim 21, in which the message is derived based at least in part on a prediction of one or more of an identity of an entity within a scene, location data, behavioral patterns, a composition, or temporal data.

24. The apparatus of claim 21, in which the message comprises at least one of camera settings, directional instructions, and a description of a scene to be captured.

25. The apparatus of claim 21, in which the first image capture device includes a module that parses the message.

26. The apparatus of claim 21, in which the at least one processor is further configured to acquire based at least in part on an output of a deep neural network.

27. A non-transitory computer-readable storage medium for cooperative photography having non-transitory program code stored thereon, the program code comprising:
- program code to receive, at a first image capture device operated by a first user, a message from a second image capture device operated by a second user, the message based at least in part on a prediction of a specified motion sequence computed by the second image capture device, the message including one or more image capture settings to be applied by the first image capture device, the one or more image capture settings being based on a lighting condition of a scene as determined by the second image capture device; and
- program code to acquire, by the first image capture device, an image of an object of interest based at least in part on the message.

28. The non-transitory computer-readable storage medium of claim 27, in which the message is derived based at least in part on an identity of an entity within a scene, location data, behavioral patterns, a composition, temporal data, or any combination thereof.

29. The non-transitory computer-readable storage medium of claim 27, in which the message is derived based at least in part on a prediction of one or more of an identity of an entity within a scene, location data, behavioral patterns, a composition, or temporal data.

30. The non-transitory computer-readable storage medium of claim 27, in which the message comprises at least one of camera settings, directional instructions, and a description of a scene to be captured.

31. The non-transitory computer-readable storage medium of claim 27, in which the first image capture device includes a module that parses the message.

32. The non-transitory computer-readable storage medium of claim 27, in which the program code is further configured to acquire based at least in part on an output of a deep neural network.

* * * * *